United States Patent [19]

Bluestein

[11] Patent Number: 4,529,752

[45] Date of Patent: Jul. 16, 1985

[54] SOLVENT RESISTANT VULCANIZABLE SILICONE RUBBER COMPOSITION

[75] Inventor: Ben A. Bluestein, Schenectady, N.Y.

[73] Assignee: General Electric Company, Waterford, N.Y.

[21] Appl. No.: 414,226

[22] Filed: Sep. 2, 1982

[51] Int. Cl.³ .................................................. C08L 83/08
[52] U.S. Cl. .................................... 523/214; 523/212; 524/425; 524/430; 524/431; 524/433; 524/437; 524/588; 524/500; 525/478
[58] Field of Search ............... 525/478; 523/214; 524/588, 500

[56] References Cited

U.S. PATENT DOCUMENTS

| | | | |
|---|---|---|---|
| 3,006,878 | 10/1961 | Talcott | 525/102 |
| 3,069,378 | 12/1962 | Prober | 525/102 |
| 3,127,433 | 3/1964 | Tarrant | 528/42 |
| 3,179,619 | 4/1965 | Brown | 524/860 |
| 3,328,349 | 6/1967 | Lentz | 528/31 |
| 3,338,847 | 8/1967 | Nitzsche et al. | 525/478 |
| 3,436,366 | 4/1969 | Modic | 524/862 |
| 3,661,833 | 5/1972 | Larson | 524/588 |
| 3,697,473 | 10/1972 | Polmanteer et al. | 524/862 |
| 3,957,713 | 5/1976 | Jeram et al. | 260/32.85 B |
| 3,974,122 | 8/1976 | Sato et al. | 524/500 |
| 3,983,298 | 9/1976 | Hahn et al. | 428/355 |
| 4,029,629 | 6/1977 | Jeram | 523/203 |
| 4,032,502 | 6/1977 | Lee et al. | 523/212 |
| 4,041,010 | 8/1977 | Jeram | 524/16 |
| 4,045,390 | 8/1977 | Itoh et al. | 524/267 |
| 4,162,356 | 7/1979 | Grenoble | 528/31 |
| 4,189,545 | 2/1980 | Modic | 521/131 |
| 4,196,273 | 4/1980 | Imai et al. | 528/15 |
| 4,222,983 | 9/1980 | August et al. | 264/220 |
| 4,293,671 | 10/1981 | Sasaki et al. | 525/478 |
| 4,311,739 | 1/1982 | Hardman et al. | 427/387 |

*Primary Examiner*—Wilbert J. Briggs, Sr.

[57] ABSTRACT

Solvent resistant, room temperature vulcanizable silicone rubber compositions are improved by blending a siloxane resin of the type having silsesquioxane units containing a perfluorinated alkyl ethyl radical thereon with a vinyl-containing polymer and a hydride-containing resin or a hydrogen-containing polysiloxane as a cross-linking agent. The solvent resistant room temperature vulcanizable silicone rubber compositions also contain a catalyst, such as, a platinum catalyst. The compositions optionally contain filler. An example of the siloxane resin having silsesquioxane units and perfluorinated alkyl radical thereon is $R''SiO_{1.5}$ wherein $R''$ is a $(-CH_2-)_aR'$ radical where $R'$ is perfluoroalkyl of 1 to about 8 carbon atoms, $a$ is at least 2 but less than 10, and $(-CH_2-)_a$ is a straight or branched chain, and in a preferred embodiment, $R'$ is $-CF_3$, and $a$ is 2, and the $R''SiO_{1.5}$ is derived from 3,3,3-trifluoropropyltrichlorosilane.

32 Claims, No Drawings

SOLVENT RESISTANT VULCANIZABLE SILICONE RUBBER COMPOSITION

BACKGROUND OF THE INVENTION

The present invention relates to solvent resistant vulcanizable silicone rubber compositions, and more particularly, the present invention relates to an improved two-component room temperature vulcanizable silicone rubber composition having fluorinated substituent groups in the polymers which are cured in the presence of a platinum catalyst to form a solvent resistant elastomer.

Silicone elastomers are well known in the art and are used for many applications in which high and low temperature stability are desired.

One class of solvent resistant room temperature vulcanizable silicone rubber compositions is disclosed and claimed in U.S. Pat. No. 4,041,010 which is incorporated herein by reference. The solvent resistant room temperature vulcanizable silicone rubber compositions disclosed and claimed in U.S. Pat. No. 4,041,010 comprise: (A) 100 parts of a mixture composed of (i) 100 parts of a vinyl-containing polymer of the formula,

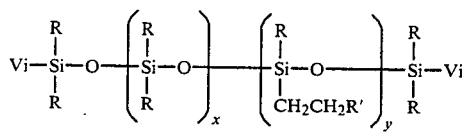

where Vi is vinyl, R is selected from the class consisting of alkyl radicals of 1 to 8 carbon atoms and phenyl, R' is perfluoroalkyl of 1 to 8 carbon atoms, x an y are at least 1 and the viscosity of the compound varies from 1,000 to 500,000 centipoise at 25° C., and the concentration of siloxy units taken y times varies from 5 to 98 mole pecent; (ii) from 1 to 60 parts of a vinyl-containing resin selected from the class consisting of a resin having ViRR″SiO$_{0.5}$ units and SiO$_2$ units where the hydrocarbon substituent to Si ratio varies from 0.8 to 2.7; a resin having ViRR″SiO$_{0.5}$ units, SiO$_2$ units and RR″SiO units where the hydrocarbon substituent to Si ratio varies from 0.8 to 2.4; a resin having ViR$_2$SiO$_{0.5}$ units, R$_2$R″SiO$_{0.5}$ units, SiO$_2$ units and RR″SiO units where the hydrocarbon subsituent to Si ratio varies from 0.8 to 2.4; and a resin having R$_2$R″SiO$_{0.5}$ units, SiO$_2$ units and ViR″SiO units where the hydrocarbon substituent to Si ratio varies from 0.8 to 2.4, where Vi and R are as previously defined, R″ is selected from the class consisting of alkyl radicals of 1 to 8 carbon atoms, phenyl radicals and —CH$_2$CH$_2$R' radicals, where R' is as previously defined and the vinyl concentration of said resin must not differ more than 20 mole percent from the vinyl concentration of polymer (i); (iii) from 0.1 to 50 parts per million of the total composition of a platinum catalyst; and (B) from 1 to 50 parts based on 100 parts of the mixture of (A) of a cross-linking polymer selected from the class
consisting of (iv) a resin having

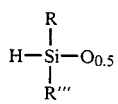

units and SiO$_2$ units where the R+R‴+H to Si ratio varies from 1.0 to 2.7; (v) a resin having

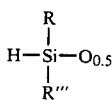

units, SiO$_2$ units and RR‴SiO units where the R+R‴+H to Si ratio varies from 1.2 to 2.7; and (vi) a polymer of the formula

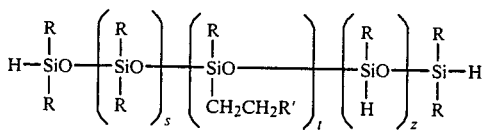

and mixtures thereof and where the concentration of the units taken t times varies from 0 to 75 mole percent, where R and R' are as previously defined, s is at least 1, t and z may be zero or a positive integer, and the viscosity of the polymer varies from 10 to 1000 centipoise at 25° C., and R‴ is selected from the class consisting of alkyl radicals of 1 to 8 carbon atoms and —CH$_2$CH$_2$R' radicals.

The foregoing compositions described and claimed in U.S. Pat. No. 4,041,010 overcome many prior art deficiencies by having proper solvent resistance to hydrocarbon fluids, good physical properties and a fast cure rate at elevated temperatures even though the compositions are SiH-olefin platinum catalyzed silicone rubber compositions having fluorinated substituent radicals.

Although the elastomers of U.S. Pat. No. 4,041,010 have good elastomer properties, it is desirable to improve the properties of the elastomers for various uses. For example, it is desirable in certain instances to improve the tensile strength-elongation properties of silicone elastomer products of the SiH-olefin platinum catalyzed silicone rubbers having fluorinated substituent radicals without affecting the solvent resistance of the silicone rubber composition to hydrocarbon fluids and without substantially affecting the cure rate at elevated temperatures.

SUMMARY OF THE INVENTION

Accordingly, it is an object of the present invention to provide solvent resistant vulcanizable silicone rubber compositions having improved properties and a process for making the improved solvent resistant vulcanizable silicone rubber compositions.

It is another object of the present invention to provide a catalyzed SiH-olefin room temperature vulcanizable silicone rubber composition having solvent resistance and improved elastomer properties.

Still another object of the present invention is to provide a solvent resistant room temperature vulcanizable silicone rubber composition and method for making the solvent resistant room temperature vulcanizable silicone rubber composition which has improved hardness, tensile strength and/or elongation.

These and other advantages of the invention will become apparent from the following description.

In accordance with the foregoing objects, there is provided in improved solvent resistant vulcanizable silicone rubber composition comprising:

(A) 100 parts of a mixture comprised of:

(i) 100 parts of a vinyl-containing polymer of the formula,

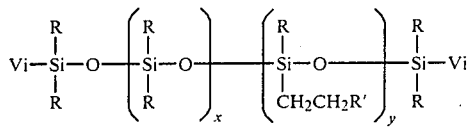

where Vi is vinyl, R is selected from the group consisting of alkyl radicals of 1 to about 8 carbon atoms and phenyl, R' is perfluoroalkyl of 1 to about 8 carbon atoms, x is at least 1, and y is at least 10, and the viscosity of the compound is at least 300 centipoise at 25° C., and the concentration of siloxy units taken y times varies from about 5 to about 98 mole percent;

(ii) from about 1 to about 60 parts of a resin having $SiO_2$ units, $R''SiO_{1.5}$ units and vinyl-containing siloxane units selected from the group consisting of $ViRR''SiO_{0.5}$, $ViR_2SiO_{0.5}$, $ViR''SiO$ and mixtures thereof; and optionally a siloxane selected from the group consisting of $R_3SiO_{0.5}$ and $R_2R''SiO_{0.5}$ units; where the hydrocarbon substituent to Si ratio varies from about 0.8 to about 2.4; Vi is vinyl; R is selected from the group consisting of alkyl radicals of 1 to about 8 carbon atoms and phenyl; $R''$ is a $(-CH_2-)_aR'$ radical where R' is perfluoroalkyl of 1 to about 8 carbon atoms, a is at least 2 but less than 10, and $(-CH_2-)_a$ is straight or branched chain;

(iii) a suitable amount of catalyst capable of promoting the cure of the mixture; and (B) from about 1 to about 50 parts, based on 100 parts of the mixture (A), of a cross-linking polymer selected from the group consisting of (iv) a resin having

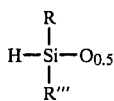

units and $SiO_2$ units where the $R+H+R'''$ to Si ratio varies from about 1.0 to about 2.71;

(v) a resin having

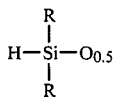

units, $SiO_2$ units and $RR'''SiO$ units where the $H+R+R'''$ to Si ratio varies from about 1.2 to about 2.7; and (vi) a polymer of the formula;

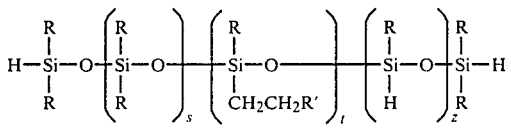

and mixtures thereof; and where the concentration of the units taken t times varies from 0 to about 75 mole percent, where R is selected from the group consisting of alkyl radicals of 1 to about 8 carbon atoms and phenyl; R' is perfluoroalkyl of 1 to about 8 carbon atoms; s is at least 1; $R'''$ is selected from the group consisting of alkyl radicals of 1 to about 8 carbon atoms and $-CH_2CH_2R'$ radicals; t and z may be zero or a positive integer; and the viscosity of the polymer varies from about 10 to about 1,000 centipoise at 25° C.

It has been discovered that if the resin portion of the mixture contains $R''SiO_{1.5}$ units rather than $RR''SiO$ units or $R_2R''SiO_{0.5}$ units, (R, R' and R'' are the same as defined above), a marked improvement in the tensile strength and elongation properties of the silicone rubber elastomer results even in the absence of a filler. However, in accordance with the present invention, it may also be desirable to add a filler to the mixture or blend to optimize or maximize certain physical properties.

The catalyst capable of promoting the cure of the mixture may be any of the well-known catalysts, and it may be used in a suitable amount to cure the vulcanizable mixture. For example, both platinum and rhodium catalysts may be used in the process and composition of the present invention, and many well-known platinum and rhodium catalysts are disclosed in the prior art. The preferred catalysts are platinum catalysts and may be a simple type of catalyst, such as, platinum metal deposited on a solid carrier, such as, charcoal or gamma-alumina, or it may be a platinum in the form of a soluble platinum complex. In addition, in certain preferred embodiments, it may be desirable to use a cure inhibitor in the composition to extend the work life of the composition at room temperature.

The composition may be simply cured by mixing the hydride cross-linking agent into mixture (A) and allowing the composition to cure either at room temperature (room temperature vulcanizable), or if desired, at elevated temperatures, whereupon at elevated temperatures, that is, above about 100° C., the composition cures to an elastomer in a very short period of time.

Generally, the composition as manufactured and prior to use, is formed in two components where the base vinyl-containing polymers, resin, fillers and platinum catalysts are prepared in one component or package, and the hydride cross-linking agent is prepared in the second component or package. When the end user decides to utilize the composition to fabricate various parts, the two components are simply mixed together in the preferred concentrations, and the mixture is allowed to cure to form the solvent resistant silicone rubber composition of the present invention.

It can be realized that various forms of mixing of various of the ingredients can be carried out in accordance with the process of the present invention. For example, portions of the vinyl-containing resin and the vinyl-containing polymer, as well as the filler, may be incorporated into the second component with the hydride cross-linking agent, as desired, without detracting from the usability of the composition or from the final physical properties of the composition. It is only necessary in forming the two components that the platinum catalyst be inserted in the first component, that is, along with the vinyl-containing polymer and the vinyl-containing resin, or that the platinum catalyst be used separately as a third component.

In accordance with the objects of the present invention, there is also provided a process for making improved solvent resistant silicone elastomers comprising:

(a) mixing:

(A) 100 parts of a mixture comprised of:

(i) 100 parts of vinyl-containing polymer of the formula,

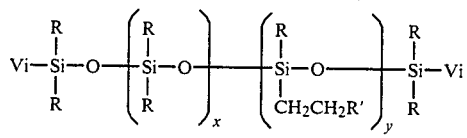

wherein Vi is vinyl, R is selected from the group consisting of alkyl radicals of 1 to about 8 carbon atoms and phenyl, R' is perfluoroalkyl of 1 to about 8 carbon atoms, x is at least 1, and y is at least 10, and the viscosity of the compound is at least 300 centipoise at 25° C., and the concentration of siloxy units taken y times varies from about 5 to about 98 mole percent;

(ii) from about 1 to about 60 parts of a resin having $SiO_2$ units, $R''SiO_{1.5}$ units and vinyl-containing siloxane units selected from the group consisting of $ViRR''SiO_{0.5}$, $ViR_2SiO_{0.5}$, $ViR''SiO$ and mixtures thereof; and optionally a siloxane selected from the group consisting of $R_3SiO_{0.5}$ and $R_2R''SiO_{0.5}$ units; where the hydrocarbon substituent to Si ratio varies from about 0.8 to about 2.4; Vi is vinyl; R is selected from the group consisting of alkyl radicals of 1 to about 8 carbon atoms and phenyl; R'' is a $(-CH_2-)_aR'$ radical where R' is perfluoroalkyl of 1 to about 8 carbon atoms, a is at least 2 but less than 10 and $(-CH_2-)_a$ is a straight or branched chain; and (iii) a suitable amount of catalyst capable of promoting the cure of the mixture; with (B) from about 1 to about 50 parts, based on about 100 parts of the mixture (A), of a cross-linking polymer selected from the group consisting of (iv) a resin having

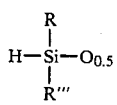

units and $SiO_2$ units where the $R+H+R'''$ to S ratio varies from about 1.0 to about 2.71;

(v) a resin having

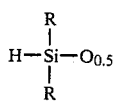

units, $SiO_2$ units and $RR'''SiO$ units where the $H+R+R'''$ to Si ratio varies from about 1.2 to about 2.7; and (vi) a polymer of the formula

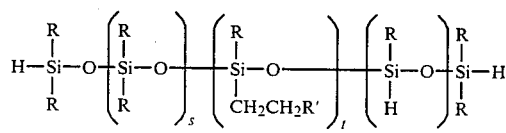

and mixtures thereof; and where the concentration of the units taken t times varies from 0 to about 75 mole percent; where R is selected from the group consisting of alkyl radicals of 1 to about 8 carbon atoms and phenyl; R' is perfluoroalkyl of 1 to about 8 carbon atoms; s is at least 1; R''' is selected from the group consisting of alkyl radicals of 1 to about 8 carbon atoms and $-CH_2CH_2R'$ radicals; t and z may be zero or a positive integer; and the viscosity of the polymer varies from about 10 to about 1,000 centipoise at 25° C.; and (b) allowing the mixture to cure.

DETAILED DESCRIPTION OF THE INVENTION

Component (A) (i) has been discussed in detail in U.S. Pat. No. 4,041,010, and in the vinyl-containing polymer of the formula:

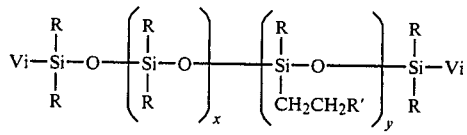

R is generally selected from alkyl radicals of 1 to about 8 carbon atoms and phenyl radicals. Preferably, R is an alkyl radical of 1 to 3 carbon atoms, such as, methyl, ethyl and propyl. R' in the above formula is a perfluoroalkyl radical of 1 to about 8 carbon atoms, and R' is most preferably $CF_3$. In the above formula, x may vary from 1 to about 1,000. It is only necessary that x be at least 1 and y at least 10, and such that the viscosity of the final polymer may vary from about 1,000 to about 500,000 centipoise at 25° C., and preferably varies from about 1,000 to 100,000 centipoise at 25° C. In accordance with the present invention, the viscosity of the above compound itself is at least 300 centipoise at 25° C., and the concentration of siloxy units taken y times varies from about 5 to about 98 mole percent in the total polymer, and preferably, the concentration of the siloxy units taken y times varies from 30 to 98 mole percent. The polymers of the foregoing formula may be made by a variety of ways. In preferred embodiments, they are generally made by the process which comprises reacting alkyl cyclic siloxanes, such as, octaalkylcyclotetrasiloxanes, with alkyl perfluoroalkylalkylene cyclic polysilanes, such as, alkyl perfluoromethylethylenecyclopolysiloxanes, at temperatures between 25° C. and 150° C. in the presence of a catalyst, which is preferably cesium hydroxide, potassium hydroxide or potassium or sodium silanolates.

To control the viscosity of the final polymer having the foregoing formula such that it has the desired end viscosity, there is incorporated into th equilibration mixture chain-stoppers which are disiloxanes or trisiloxanes or low molecular weight linear polysiloxanes which have terminal vinyl-containing siloxy units. The resulting mixture is equilibrated at the temperatures specified above for a sufficient period of time such that equilibrium is reached and as much of the cyclosiloxanes are being converted to the desired polymer as there is of the desired polymer breaking up and being reconverted into the cyclosiloxanes. At equilibrium, there is substantial conversion of the cyclosiloxanes to the linear polymer. At this point the catalyst is neutralized; the cyclosiloxanes are stripped off; and the desired polymer of the above formula is obtained. Other methods of producing such as polymer are also well-known in the art, including U.S. Pat. No. 2,979,519.

The vinyl-containing siloxane resin of (A) (ii) may be formed by various methods well-known in the art as long as the resin contains $R''SiO_{1.5}$ units wherein R'' is a $(-CH_2-)_aR'$ radical where R' is perfluoroalkyl of 1 to about 8 carbon atoms, a is at least 2 but less than 10, and $(-CH_2-)_a$ is straight or branched chain. R' may alternatively be expressed as a beta-perfluoroalkyl ethyl radical. In preferred embodiments, the R' of component (A) (ii) is —CF$_3$, and a is 2, thus R" would be beta-trifluoromethyl ethyl radical or 3,3,3-trifluoropropyl radical. In certain other preferred embodiments, the R"SiO$_{1.5}$ units of component (A) (ii) are derived from trifluoropropyltrichlorosilane. Examples of beta-perfluoroalkylethyl radicals which may be used in the resin component of the present invention and which may be derived from, for example, the corresponding perfluoroalkylethyltrichlorosilane, include beta-trifluoromethyl-n-propyl radical, beta-trifluoromethylisopropyl radical, beta-perfluoroethylethyl radical, beta-perfluorobutylethyl radical, beta-perfluoroisobutylisopropyl radical, beta-perfluoroheptylethyl radical, and the like.

In preferred embodiments, and by the process of the present invention, the siloxane resin component (A) (ii) is derived from the catalyzed hydrolysis of a blend of a trialkylhalosilane; a vinyldialkylhalosilane; a halosilane having at least one perfluoroinated alkyl group and having the formula X$_3$—Si(—CH$_2$)$_a$R', where R' is perfluoroalkyl of 1 to about 8 carbon atoms, a is at least 2 but less than 10, (—CH$_2$)$_a$ is straight chain or branched, and x is a halogen; and an alkyl silicate. In the process of the present invention, the preferred perfluorinated halosilane is trifluoromethylethyltrichlorosilane; the trialkylhalosilane is trimethylchlorosilane; and the vinyldialkylhalosilane is vinyldimethylchlorosilane.

As discussed above, it is critical in the process of the present invention for making the improved solvent resistant room temperature vulcanizable silicone rubber composition that the siloxane resin contain the siloxane derived by hydrolysis of a compound having the formula R'(—CH$_2$—)$_a$Si—X$_3$, where R' is perfluoroalkyl of 1 to about 8 carbon atoms, a is at least 2 but less than 10, (—CH$_2$—)$_a$ is straight or branched chain, and X is a halogen, such as, chlorine. After the controlled hydrolysis of the foregoing halosilane mixture having at least one perfluorinated alkyl group, the resin to be used for the improved solvent resistant room temperature vulcanizable silicone rubber composition, comprises R"SiO$_{1.5}$ units wherein R" is a (—CH$_2$—)$_a$R' radical where R' is perfluoroalkyl of 1 to about 8 carbon atoms, a is at least 2 but less than 10, and (—CH$_2$—)$_a$ is straight or branched chain. In accordance with the process and composition of the present invention, one silicon specie must be tri-functional, designated herein as having 1.5 oxygen atoms on the silicon atom. This tri-functional siloxane is generally known in the art as a silsesquioxane, and each of the oxygen atoms upon the silicon atom is shared with another silicon atom. It is this tri-functional ingredient of the present invention which results in the improved solvent resistant vulcanizable silicone rubber composition, and in more specific embodiments, in the improved solvent resistant room temperature vulcanizable silicone rubber composition.

In the preferred method of forming the desired resin of the present invention, the halosilane having at least one perfluorinated alkyl group and having the formula X$_3$—Si(—CH$_2$)$_a$R', wherein R', a and X are defined above, is blended with an appropriate vinyl-containing substituent, such as, ViRR"SiX, ViR$_2$SiX, ViR"SiX$_2$ and mixtures thereof, and optionally, R$_3$SiX and/or R$_2$R"SiX1, along with a condensed alkylsilicate or alkyl orthosilicate.

Various mixtures, of the foregoing halogen-containing silanes may be used in the controlled hydrolysis method of the present invention. For example, various of the foregoing halosilanes and orthosilicates may be mixed to provide a resin having, for example, ViRR"SiO$_{0.5}$ units, SiO$_2$ units, optionally, R$_3$SiO$_{0.5}$ and/or R$_2$R"SiO$_{0.5}$ units, and R"SiO$_{1.5}$ units where the hydrocarbon substituent to Si ratio varies from about 0.8 to about 2.4; ViR$_2$SiO$_{0.5}$ units, SiO units, optionally, R$_3$SiO$_{0.5}$ units, R$_2$R"SiO$_{0.5}$ units and R"SiO$_{1.5}$ units where the hydrocarbon substituent to Si ratio varies from about 0.8 to about 2.4; ViR$_2$SiO$_{0.5}$ units, SiO$_2$ units, optionally, R$_3$SiO$_{0.5}$ units, R$_2$R"SiO$_{0.5}$, ViR"SiO units and R"SiO$_{1.5}$ units; and ViR"SiO units, SiO$_2$ units, optionally, R$_3$SiO$_{0.5}$ units and/or R$_2$R"SiO$_{0.5}$ units, and R"SiO$_{1.5}$ units and the like. Although the resin component and the polymer component must contain vinyl-containing units, the vinyl concentration of the resin and the vinyl concentration of the polymer are not critical as long as the resin and the polymer are compatible and form the improved solvent resistant silicone elastomers.

In one preferred process of the present invention, the halogen compounds discussed above, for example, a trialkylhalosilane, a vinyldialkylhalosilane and halosilane having the formula X$_3$—Si(—CH$_2$—)$_a$R' as defined above, are reacted with a condensed alkyl silicate, for example, ethyl silicate, to provide the desired resins. A solution of the halosilanes in an inert organic solvent is formed in which the organic solvent is insoluble or substantially insoluble in water and is selected from the class consisting of (1) aliphatic and aromatic hydrocarbons, (2) ethers containing at least 4 carbon atoms, (3) esters, and (4) halocarbons.

In addition, solvents such as, butyl acetate and ethyl acetate can be utilized which are the preferred solvents for the silane derivatives and ketone solvents, and various chlorinated hydrocarbon solvents.

The halosilanes and orthosilicate are dissolved in the solvent, and then water is added. The mixture is vigorously stirred during the reaction which is exothermic. After the reaction has proceeded to completion, the agitation is discontinued, and the reaction mixture is allowed to separate into two layers. The lower aqueous layer is removed, and the organic layer is stripped to reduce the acid. To the resin solution there is added solvent as is necessary and 100 to 1000 parts per million of an alkali metal hydroxide, such as, potassium hydroxide. The resulting mixture is heated to from 50° C. to 200° C. for 2 to 4 hours until the silanol content of the resin is lowered to below 0.5 weight percent. The alkali metal hydroxide is then neutralized, and some of the solvent is stripped off to yield the desired resin in solution. Although it is not necessary to so body the vinyl-containing resins of the present composition, it has been found that the compositions with the best physical properties are obtained where the silanol content of the resins is below 0.5 weight percent.

In addition to the vinyl content of the resin it is understood that the resin contain some —CH$_2$CH$_2$R' substituent groups where R' is as previously defined. Accordingly, in the formula of such resins, R" is preferably selected from the class consisting of alkyl radicals of 1 to 8 carbon atoms and is preferably methyl, phenyl radicals or —CH$_2$CH$_2$R' radicals. Preferably, the (R)R'CH$_2$CH$_2$SiO mole percent siloxy content in the resin is the same as the concentration of such units in the polymer of (A) (i), and most preferably, it is within 10–20 mole percent of the concentration of such units in the polymer of the formula of (A) (i).

In another method for forming the desired resin of the present invention wherein to 100 parts of the vinyl-containing polymer of component (A) (i), there may be added from 1 to 60 parts of the vinyl-containing resin, a silica hydrosol may be reacted with the appropriate halosilane mixture including a compound of the formula R'(—CH$_2$—)$_a$Si—X$_3$ where R', a and X are previously defined. The silica hydrosols employed are prepared in the usual manner by neutralizing sodium silicate solutions. This neutralization may be carried out either by employing an acid or a chlorosilane. In the latter case, it is not necessary to add any additional acid to the raction mixture. Whereas the silica sol at any concentration would react with the above defined organosilicon compounds under acid conditions, it is preferred that the sol have a concentration of from 1 to 35 percent by weight of SiO$_2$.

The silanes and siloxanes may be employed individually or in a mixture. In such cases, the halosilane may be added directly to the sodium silicate solution. It is preferred at this point to add a lower alcohol, such as, isopropanol, to stabilize the mixture. This method is discussed in detail in U.S. Pat. No. 4,041,010.

The third ingredient in the composition in the present invention which must be present, is a suitable amount of catalyst capable of promoting the cure of the two-component mixture. That is, when component (A) and component (B) are mixed, the catalyst must be present in a sufficient amount to promote the cure of the mixture in the formation of the improved solvent resistant silicone rubber composition. Generally, a sufficient amount of the catalyst is between about 0.1 to about 50 parts per million of the total composition, however, one skilled in the art can determine that amount of catalyst required to affect the desired cure of the two components. The foregoing concentration is designated in parts by weight of catalyst present in the total composition. The catalyst which may be utilized in the present composition and process, may be any suitable catalyst known to cure vinyl-containing siloxanes, for example, conventional platinum catalysts and rhodium catalysts may be utilized in the present composition and process. In most of the prior art, platinum catalysts are preferred, and accordingly, platinum catalysts are discussed in detail herein.

The platinum catalysts which may be utilized in the present process and composition, may be platinum deposited on a solid carrier, such as, platinum on charcoal or platinum on gamma alumina, or it may be solubilized platinum complex. The solubilized platinum complexes are preferred in the present composition since they are more reactive.

Preferred platinum catalysts are those platinum compound catalysts which are soluble in the present reaction mixture. The platinum compound can be selected from those having the formula (PtCl$_2$.Olefin)$_2$ and H(PtCl$_3$.Olefin) as described in U.S. Pat. No. 3,159,601. The olefin shown in the previous two formulas can be almost any type of olefin but is preferably an alkene having from 2 to 8 carbon atoms, a cycloalkene having from 5 to 7 carbon atoms or styrene. Specific olefins utilizable in the above formulas are ethylene, propylene, the various isomers of butene, octene, cyclopentene, cyclohexene, cycloheptene, and the like.

A further platinum containing material usable in the composition of the present invention is the platinum chloride cyclopropane complex (PtCl$_2$.C$_3$H$_6$)$_2$ described in U.S. Pat. No. 3,159,662.

Still further, the platinum containing material can be a complex formed from chloroplatinic acid with up to 2 moles per mole of platinum of a member selected from the class consisting of alcohols, ethers, aldehydes and mixtures of the above as described in U.S. Pat. No. 3,220,972.

The prefered platinum compound to be used not only as a platinum catalyst but also as a flame retardant additive is that disclosed in U.S. Pat. No. 3,775,452. Generally, this type of platinum complex is formed by reacting chloroplatinic acid containing 4 moles of water of hydration with a tetravinylcyclotetrasiloxane in the presence of sodium bicarbonate in an ethanol solution.

The catalysts of U.S. Pat. Nos. 3,220,972 and 3,775,452 are preferred in the present composition since they are the most reactive, and because they permit an easily controlled cure rate. The catalyst of U.S. Pat. No. 3,775,452 which is the most preferred, is generally an alkenyl polysiloxane complexed with platinum, and it is substantially free of chlorine groups. Generally, when the composition is prepared, the platinum catalyst is incorporated into the vinyl-containing resin and the vinyl-containing polysiloxane of component (A) (i) as a separate first component. When it is desired to cure the composition, the hydride cross-linking agent of component (B) is added to or incorporated in the first component or component (A) containing the vinyl-containing siloxane polymer (i), the vinyl-containing siloxane resin (ii) and the catalyst (iii) to produce a cured silicone elastomer.

The second component or component (B) of the improved solvent resistant room temperature vulcanizable silicone rubber composition is described in detail in U.S. Pat. No. 4,041,010 which is incorporated herein by reference. Generally, there is utilized from about 1 to about 50 parts of the hydride cross-linking agent per 100 parts of the first component or component (A) of the composition, and more preferably, from about 1 to about 25 parts of the hydride cross-linking agent per 100 parts of the first component or component (A) are utilized. Several hydride cross-linking agents are described herein, including those which are resins and those which are polymers. It is desirable that the hydride cross-linking agent, whether it is a resin or a polymer, contain comparable concentrations of perfluoroalkyl siloxy substituent groups at the concentration similar to that found in the vinyl-containing polymer of component (A) (i). However, this is not necessary for the composition and process of the present invention, but if such hydride cross-linking agent is utilized, its compatibility with, and the solvent resistance of, the total cured elastomer is enhanced. With respect to the hydride cross-linking resins, such resins are prepared in much the same way as the vinyl-containing resins discussed above, except there is utilized as silane reactants, hydride-containing chlorosilanes and alkoxysilanes as discussed in U.S. Pat. No. 4,041,010 and in U.S. Pat. No. 4,029,629, incorporated herein by reference. In U.S. Pat. No. 4,029,629, there is disclosed and claimed a solvent resistant room temperature vulcanizable silicone rubber composition comprising a blend of vinyl-terminated polysiloxanes having from 2 to 98 mole percent of alkylperfluoroalkylalkylene siloxy units in the polymer chain, a hydride cross-linking agent selected from the class consisting of hydride-containing resins composed of mono-functional units and tetra-functional units and hydride-containing polysiloxanes or a mixture of the above cross-linking agents which composition is cured in the presence of a platinum catalyst. Again, these hydride resins need not be bodied, but cured compositions with better physical properties are obtained if the hydride resins have a silanol content below 0.5 weight percent. The preferred bodying method for the hydride resins is that described in U.S. Pat. No. 4,029,629.

The hydride-containing polysiloxane polymers having the formula

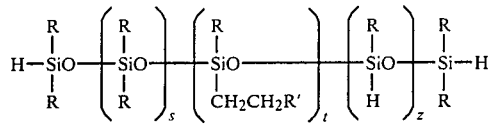

wherein R, R", s, t and z are the same as defined above under component (B)(vi), may also be used in the process and composition of the present invention. These polysiloxane polymers are prepared similar to the process for preparing the vinyl-containing polymer of component (A), except that an acid equilibration catalyst must be used, such as, sulfuric acid, that is, by the equilibration of tetramers with sufficient chain-stoppers in the presence of sulfuric acid, such that the end viscosity of the polymer mixture varies from 10 to 1,000 centipoise at 25° C.

An alternate procedure of preparing the polymer of the foregoing formula, that is, component (B)(vi), is by the hydrolysis of the appropriate chlorosilanes including hydride dialkylchlorosilanes as chain-stoppers. The chlorosilanes are hydrolyzed in water, and the resulting polymer is separated from the hydrolyzate, first removing the water and solvent and then stripping off any cyclics that may be formed in the hydrolysis. This procedure is desirable when it is desired to obtain the hydride polysiloxane polymer of the foregoing formula, component (B)(vi), at low viscosity, that is, at the level of about 10 to about 100 centipoise at 25° C.

Generally in the polymer of the foregoing formula, s may vary from 1 to about 1,000, t may vary from 0 to about 1000, but the sum of these must be at least 1, and the symbols must be of such values that the final viscosity of the polymer varies from about 10 to about 1000 centipoise at 25° C. However, z may have a value of 1 and above if it is desired to include hydride units in the polymer chain. Again, z may be any value along with the values of s and t such that the viscosity of the final polymer varies from about 10 to about 1,000 centipoise at 25° C. Generally, the (R)R'CH2CH2SiO units taken t times vary at a concentration from 0 to about 75 mole percent and preferably from about 25 to about 75 mole percent so as to give the final cured composition the maximum solvent resistance.

The foregoing are the basic ingredients of the present composition, and the resulting composition in the uncured state will have viscosities varying anywhere from about 2,000 to about 2,000,000 centipoise or higher at 25° C., and will have desirable physical properties even without the incorporation of a filler. However, in certain preferred embodiments of the present invention, a filler or a combination of fillers may be used in component (A), component (B) or both components.

Although reinforcing filler, such as, fumed silica and precipitated silica, may be added to the composition or the components thereof to impart reinforcing properties to the silicone elastomer composition, it is not necessary to use such fillers to achieve the reinforcing properties.

Other filler materials may be added to achieve reinforcing properties, and there may be added to the mixture or to one or both of the components (A) and (B) up to about 100 parts, and preferably from about 5 to about 100 parts, preferably in component (A), of a filler which is selected from the group consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton, synthetic fibers and the like. Although fumed and precipitated silica may be advantageously incorporated into the composition, in some cases they may be undesirable since they may unduly increase the viscosity of the final uncured composition. Most of the fillers mentioned above are extended fillers and may be advantageously added to increase the final cured physical properties of the composition without unduly increasing the viscosity of the composition prior to cure. If it is desired to increase the physical properties of the composition, there may preferably be utilized fumed silica or precipitated silica that has been treated, for example, as disclosed in U.S. Pat. No. 2,938,009 with cyclic polysiloxanes. Another method for treating fillers is disclosed in U.S. Pat. No. 3,024,125.

More specifically, the silazane treated fillers in accordance with the disclosure in U.S. Pat. No. 3,635,743 and U.S. Pat. No. 3,847,848, can be utilized as treated fillers to be utilized in the composition of the present case.

Other well known additives which may be utilized in the composition of the present invention, are heat stabilizing agents and cure inhibitors. For instance, there may be utilized in component (A) from about 0.1 to about 5 parts of iron oxide and preferably, red iron oxide, which also acts as a pigment. The basic function of the iron oxide is to act as a heat stabilizing agent. Other types of pigments may be utilized in the composition.

In addition, it can be appreciated that the SiH-olefin platinum catalyzed compositions can cure at room temperature over prolonged periods of time, such as, 10 minutes to 12 hours, or they can cure at elevated temperatures in extremely short periods of time, for example, within a few seconds at temperatures above about 100° C.

To give the composition extended work life at room temperature, there may be incorporated into the composition a cure inhibitor. Thus, there may be incorporated into component (A) from about 100 to about 10,000 parts per million of a cure inhibitor which may advantageously be an alkenyl containing cyclic polysiloxane.

Examples of such cure inhibitors which may be utilized, are methylvinylcyclotetrasiloxane, methylallylcyclotrisiloxane, ethylallylcyclotetrasiloxane, and the like. With such a cure inhibitor in the composition, the present composition may have a work life at room temperature of anywhere from about 2 to about 16 hours. The advantages of such a cure inhibitor in the composition is that it allows the composition to be worked and processed in its low viscosity state to fabricate various parts and to give sufficient time to act on the composition prior to cure.

Although in preferred embodiments, composition component (A) contains the vinyl-containing polymer, the vinyl-containing resin and the platinum catalyst to form a single first component, and component (B) contains the hydride cross-linking agent to form a single second component, the composition may be formulated in various ways. For instance, there may be some of the vinyl-containing resin of component (A)(i), as well as the filler, mixed in with the hydride of the second component. It is only necessary that the catalyst be packaged or prepared in the first component along with some of the vinyl-containing polymer and some of the vinyl-containing resin. The cure inhibitor and the stabilizing agent as well as other additives and pigments are also preferably mixed into the first component since it is the largest part of the mass as compared to the second component, and since it facilitates mixing of the final composition.

To prepare the cured elastomer, the hydride cross-linking agent is mixed into component (A) thoroughly, and the composition is utilized to form various fabricated parts or as an encapsulating compound. Then the composition, when it contains a cure inhibitor as explained above, can be cured at room temperature over extended periods of time. If for some reason the cure inhibitor is not desired, then the composition can be cured at elevated temperatures in a matter of a few seconds. More preferably, the composition is cured at room temperature over an extended period of time with the cure inhibitor in the composition to allow the composition to be utilized to fabricate various parts therefrom, such as, electrical connectors.

The examples below are given for the purpose of illustrating the invention and are not intended to define or limit the scope of the invention but are merely given for the purpose of exemplifying the manner of practicing the invention and of comparing the invention with the prior art compositions and processes. All parts in the present specification are designated as parts by weight unless otherwise specified.

PREPARATION OF RESINS

Example 1

The vinyl-containing siloxane resin containing the $R''SiO_{1.5}$ units of component (A)(ii) was prepared by blending 73.7 grams (0.68 mole) of trimethylchlorosilane, 21.8 grams (0.18 mole) of vinyldimethylchlorosilane, 104.7 grams (0.45 mole) of trifluoropropyltrichlorosilane having the formula $F_3CCH_2CH_2SiCl_3$, 185.4 grams (0.9 mole) of condensed ethyl silicate and 173 grams of butyl acetate. The reactants were placed in a flask equipped with a stirrer, reflux condenser, hydrogen chloride scrubber, thermometer and an addition funnel. To this blend was added 290 mls. of water during a 9 minute period. The temperature rose to about 80° C., and the mixture was then stirred for an additional 30 minutes. The bottom layer was separated and heated in a flask equipped with a stirrer and a condenser. Distillate was removed until the pot temperature was 132° C., and the take-off temperature was 99° C. To this warm solution was added first 0.37 gram (30% by weight) potassium hydroxide to give 124 ppm potassium hydroxide, and then 0.6 grams of 30 weight percent potassium hydroxide. The mixture was heated to boiling for 2.5 hours. Upon cooling, 0.42 grams of 85% phosphoric acid was added to give 50 ppm potassium hydroxide, and then an additional 0.05 grams of phosphoric acid was added to produce an acidic mixture. The mixture was treated with filter aids, Celite 345 and Fuller's Earth and thereafter pressure-filtered. A clear fluid, weighing 154 grams, was obtained. This solution was an 80% siloxane resin solution in butyl acetate.

Example 2

A blend similar to that set forth in Example 1 was prepared by using 64.8 grams (0.6 mole) of trimethylchlorosilane, 18.0 grams (0.15 mole) of vinyldimethylchlorosilane, 172 grams (0.5 mole) of trifluoropropyltrichlorosilane, 154 grams (0.75 mole) of condensed ethyl silicate and 240 ml of butyl acetate, and the blend was hydrolyzed as in Example 1 using 375 mls. of water. The resulting product was diluted with additional butyl acetate to give a siloxane resin solids content of 70%.

EXAMPLE 3

In order to compare the resin made by the present invention with a resin made by the prior art processes, a blend of 314 grams (2.9 moles) of trimethylchlorosilane, 105 grams (0.8 mole) of vinyldimethylchlorosilane, 740 grams (3.5 moles) of trifluoropropylmethyldichlorosilane having the formula $RR''SiCl_2$ wherein R and R'' are the same as defined above, 1,192 grams (5.8 moles) of condensed ethyl silicate and 1,118 mls. of butyl acetate was prepared and hydrolyzed by the method of Example 1 using 1,864 grams of water. The filtered product weighed 1,295 grams and contained 76% silicone resin solids.

The resins of the present invention containing trifluoropropyl T-groups are illustrated in Examples 1 and 2, and the resins used in the prior art containing trifluoropropylmethyl D-groups are illustrated in Example 3. The foregoing resins of Examples 1 and 2 were blended with fluorosilicone fluids and a platinum catalyst to form component A of the improved solvent resistant room temperature vulcanizable silicone rubber composition as set forth below.

PREPARATION OF COMPONENT A

Example 4

The resins of Examples 1, 2 and 3 were blended with vinyl chain-stopped dimethyl siloxanes containing 37 mole percent of trifluoropropylmethyl siloxane having the formula

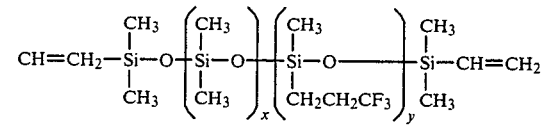

at three different viscosities of 96,000 centipoise at 25° C., 70,000 centipoise at 25° C. and 140,000 centipoise at 25° C., and such that the value of y is equal to a 37 mole percent concentration of methyltrifluoropropylsiloxy units, and the value of x equals the concentration of dimethylsiloxy units.

The forgoing fluorosilicone fluids were blended with the resins of Examples 1, 2 and 3 to give weight ratios of fluid to resin solids of 80/20, 70/30 and 67/33. These blends were made by mixing the appropriate amounts of fluid, that is, the fluorosilicone fluid having the foregoing formula with resin solution and removing the butyl acetate solvent by vacuum distillation until a pot temperature of about 130° C. was reached. To the resulting fluid/resin blend, that is, after the resin was dispersed in the vinyl-containing polymer, was added 15 parts per million in terms of platinum of a platinum complex which was formed by complexing platinum with a vinyl polysiloxane.

The foregoing blend containing the platinum catalyst formed component A of the improved solvent resistant room temperature vulcanizable silicone rubber composition.

PREPARATION OF UNFILLED ELASTOMERS

Example 5

The foregoing fluid/resin blends containing platinum catalyst were converted to elastomers by mixing them with the amounts of hydride cross-linking agent set forth in the table below. The table shows various amounts of hydride cross-linker ranging from 2.5 parts of hydride cross-linker per 100 parts of blend up to 5.0 parts of hydride cross-linker per 100 parts of blend. The specific hydride cross-linker, which is component B of the improved solvent resistant room temperature vulcanizable silicone rubber composition, was a hydride-containing polysiloxane of the formula

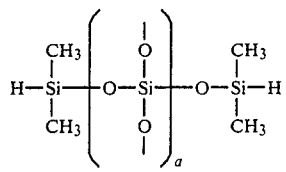

where the average value of a is about 2. The polymer also had a hydride concentration of 0.9% by weight.

The unfilled elastomer also contained 0.1% by weight based upon the weight of the blend of a conventional inhibitor, tetramethyltetravinylcyclotetrasiloxanes. The mixtures were placed into molds and pressed at about 127° C. for one hour. Clear, colorless elastomers resulted. The solvent resistance of the elastomers is similar to that disclosed for the elastomers in U.S. Pat. No. 4,041,010. The properties of the elastomers resulting from the various resin formulations in Examples 1–3 above are shown in the table below. As explained above, Examples 1 and 2 are unfilled elastomers made by using the trifluoropropylsiloxane T resins of the present invention, and Example 3 is the unfilled elastomer made from the trifluoropropylmethylsiloxane D resin of the prior art. The tests were conventional tests and are designated as hardness (Shore A)/tensile strength (pounds per square inch)/elongation (designated as percent), and the comparisons in the table below are given in that order, that is, hardness/tensile strength/elongation.

/or elongations than the prior art unfilled elastomers of Example 3. It is also apparent from the table that there is an optimum amount of hydride cross-linker for each fluid/resin blend. Although silicone rubbers have been made from many types of the prior art resins illustrated by Example 3, none of them have had elongations in the 300% and greater category, and none of them have had tensile strengths over 500 pounds per square inch. Thus, in accordance with the objects of the present invention, improved solvent resistant room temperature vulcanizable silicone rubber compositions having improvements in tensile strength and elongation have been prepared.

While other modifications of the invention and variations thereof which may be employed within the scope of the invention, have not been described, the invention is intended to include such modifications as may be embraced within the following claims.

What is claimed is:

1. An improved solvent resistant vulcanizable silicone rubber composition comprising:
   (A) 100 parts of a mixture comprising:
      (i) 100 parts of a vinyl-containing polymer of the formula,

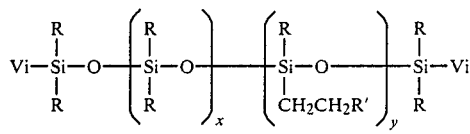

where Vi is vinyl, R is selected from the group consisting of alkyl radicals of 1 to about 8 carbon atoms and phenyl, R' is a perfluoroalkyl of 1 to about 8 carbon atoms, x is at least 1, y is at least 10, and the viscosity of the compound is at least 300 centipoise at 25° C., and the concentration of siloxy units taken y times varies from about 5 to about 98 mole percent;

(ii) from about 1 to about 60 parts of a resin having $SiO_2$ units, $R''SiO_{1.5}$ units and vinyl-containing siloxane units selected from the group consisting of $ViRR''SiO_{0.5}$, $ViR_2SiO_{0.5}$, $ViR''SiO$, and mixtures thereof, where the hydrocarbon substituent to Si ratio varies from about 0.8 to about 2.4, Vi is vinyl, R is selected from the group consisting of alkyl radicals of 1 to about 8 carbon atoms and phenyl, R'' is a $-(CH_2)_a R'$ radical where R' is a perfluoroalkyl of 1 to about 8 carbon atoms, a is at least 2 but less than 10, and $-(CH_2)_a$ is a straight or branched chain;

(iii) a suitable amount of catalyst capable of promoting the cure of the mixture; and

TABLE

| | | Elastomer Properties For Cured Resin Blends | | | | |
|---|---|---|---|---|---|---|
| Resin | Blend of Fluid/ | Amount of Hydride Cross-Linker In Parts Per 100 Of Blend | | | | |
| Example No. | Resin Solids (wt.) | 2.5 | 2.7 | 3.0 | 4.0 | 5.0 |
| 1 | 80/20 | | | 33/330/230% | 39/380/190% | |
|   | 70/30 | | | 36/380/270% | 48/500/210% | 52/530/180% |
| 2 | 80/20 | 35/380/170% | | 43/500/190% | | |
|   | 70/30 | 34/380/170% | | 46/560/180% | | |
|   | 67/33 | | 44/510/310% | 48/560/200% | 58/770/120% | |
| 3 | 80/20 | | | 28/250/180% | 26/260/190% | |
|   | 70/30 | | | 33/330/230% | 36/400/195% | 41/430/170% |

It can be seen from the foregoing table that for any specific ratio of fluid/resin, and for any specific amount of hydride cross-linker, the unfilled, cured, elastomers of Examples 1 and 2 have higher tensile strengths and- (B) from about 1 to about 50 parts, based on 100 parts of the mixture (A), of a crosslinking polymer selected from the group consisting of
(iv) a resin having

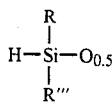

units and SiO$_2$ units, where R+H+R''' to Si ratio varies from about 1.0 to about 2.71;
(v) a resin having

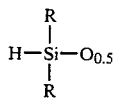

units, SiO$_2$ units and RR'''SiO units where the H+R+R''' to Si ratio varies from about 1.2 to about 2.7; and
(vi) a polymer of the formula,

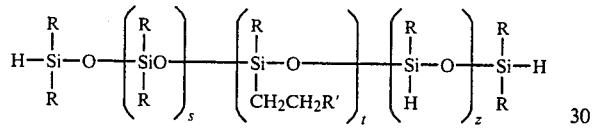

and mixtures thereof; where the concentration of the siloxy units taken t times varies from 0 to about 75 mole percent, where R is selected from the group consisting of alkyl radicals of 1 to about 8 carbon atoms and phenyl; R' is a perfluoroalkyl of 1 to about 8 carbon atoms, s is at least 1, R''' is selected from the group consisting of alkyl radicals of 1 to about 8 carbon atoms and

—CH$_2$CH$_2$R' radical, t may be 0 or a positive integer; and the viscosity of the polymer varies from about 10 to about 1000 centipoise at 25° C.

2. The improved solvent resistant vulcanizable silicone rubber composition of claim 1, further comprising up to about 100 parts of a filler in mixture (A).

3. The improved solvent resistant vulcanizable silicone rubber composition of claim 2, wherein the filler is selected from the group consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton and synthetic fibers.

4. The improved solvent resistant vulcanizable silicone rubber composition of claim 3, wherein the filler has been treated with a silicon compound.

5. The improved solvent resistant vulcanizable silicone rubber composition of claim 4, wherein the silicon compound is a silazane.

6. The improved solvent resistant vulcanizable silicone rubber composition of claim 1, wherein the viscosity of the vinyl-containing (i) is about 1000 to about 150,000 centipoise at 25° C.

7. The improved solvent resistant vulcanizable silicone rubber composition of claim 1, wherein the catalyst is a platinum compound.

8. The improved solvent resistant vulcanizable silicone rubber composition of claim 7, wherein the platinum catalyst is platinum complexed with a vinyl-containing polysiloxane.

9. The improved solvent resistant vulcanizable silicone rubber composition of claims 1, 7 or 8, wherein the catalyst comprises about 0.1 to about 50 parts per million of the total composition.

10. The improved solvent resistant vulcanizable silicone rubber composition of claims 1 or 2, wherein the R' component of (ii) is —CF$_3$ and a is 2.

11. The improved solvent resistant vulcanizable silicone rubber composition of claims 1 or 2, wherein R is —CH$_3$ and R'' is —CH$_2$CH$_2$CF$_3$.

12. The improved solvent resistant vulcanizable silicone rubber composition of claims 1 or 2, wherein the R''SiO$_{1.5}$ units of component (ii) are derived from 3,3,3-trifluoropropyltrichlorosilane.

13. A process for making improved solvent resistant silicone elastomers, comprising:
(a) mixing
(A) 100 parts of a mixture comprising:
  (i) 100 parts of a vinyl-containing polymer of the formula,

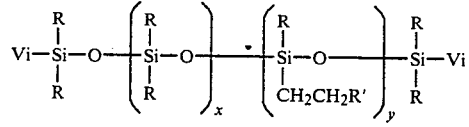

where Vi is vinyl, R is selected from the group consisting of alkyl radicals of 1 to about 8 carbon atoms and phenyl, R' is a perfluoroalkyl of 1 to about 8 carbon atoms, x is at least 1, y is at least 10, and the viscosity of the compound is at least 300 centipoise at 25° C., and the concentration of siloxy units taken y times varies from about 5 to about 98 mole percent;
  (ii) from about 1 to about 60 parts of a resin having SiO$_2$ units, R''SiO$_{1.5}$ units and vinyl-containing siloxane units selected from the group consisting of ViRR''SiO$_{0.5}$, ViR$_2$SiO$_{0.5}$, ViR''SiO, and mixtures thereof, where the hydrocarbon substituent to Si ratio varies from about 0.8 to about 2.4, Vi is vinyl, R is selected from the group consisting of alkyl radicals of 1 to about 8 carbon atoms and phenyl, R'' is a —(CH$_2$)$_a$R' radical where R' is a perfluoroalkyl of 1 to about 8 carbon atoms, a is at least 2 but less than 10, and —(CH$_2$)$_a$ is a straight or branched chain;
  (iii) a suitable amount of catalyst capable of promoting the cure of the mixture; and
(b) from about 1 to about 50 parts, based on 100 parts of the mixture (A), of a crosslinking polymer selected from the group consisting of
(iv) a resin having

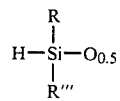

units and $SiO_2$ units, where $R+H+R'''$ to Si ratio varies from about 1.0 to about 2.71;

(v) a resin having

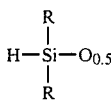

units, $SiO_2$ units and $RR'''SiO$ units where the $H+R+R'''$ to Si ratio varies from about 1.2 to about 2.7; and (vi) a polymer of the formula,

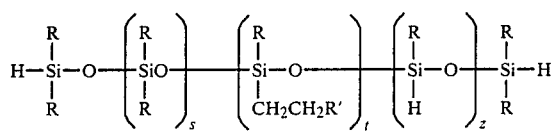

and mixtures thereof; where the concentration of the siloxy units taken t times varies from 0 to about 75 mole percent, where R is selected from the group consisting of alkyl radicals of 1 to about 8 carbon atoms and phenyl; R' is a perfluoroalkyl of 1 to about 8 carbon atoms, s is at least 1, R''' is selected from the group consisting of alkyl radicals of 1 to about 8 carbon atoms and

—$CH_2CH_2R'$ radical, t may be zero or a positive integer; and the viscosity of the polymer varies from about 10 to about 1000 centipoise at 25° C.; and (b) allowing the mixture to cure.

14. The process of claim 13, further comprising adding up to about 100 parts of a filler to mixture (A).

15. The process of claim 14, wherein the filler is selected from the group consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton and synthetic fibers.

16. The process of claim 15, wherein the filler has been treated with a silicon compound.

17. The process of claim 16, wherein the silicone compound is a silazane.

18. The process of claim 13, wherein the viscosity of vinyl-containing (i) is about 1000 to about 150,000 centipoise at 250° C.

19. The process of claim 13, wherein the catalyst is a platinum compound.

20. The process of claim 19, wherein the platinum catalyst is platinum complexed with a vinyl-containing polysiloxane.

21. The process of claims 13, 19 or 20, wherein the catalyst comprises about 0.1 to about 50 parts per million of the total composition.

22. The process of claims 13 or 14, wherein the R' of component (ii) is —$CF_3$ and a is 2.

23. The process of claims 13 or 14, wherein R is —$CH_3$ and R'' is —$CH_2CH_2CF_3$.

24. The process of claims 13 or 14, wherein the $R''SiO_{1.5}$ units of component (ii) are derived from 3,3,3-trifluoropropyltrichlorosilane.

25. The process of claims 13 or 14, wherein the $SiO_2$ units of component (ii) are derived from ethyl silicate.

26. The process of claims 13 or 14, further comprising adding up to about 10,000 parts per million based upon the total composition of a cure inhibitor.

27. The process of claim 13, wherein the resin (ii) is derived from the catalyzed hydrolysis of a blend of a trialkylhalosilane, a vinyldialkylhalosilane, a halosilane having at least one perfluorinated alkyl group and having the formula

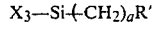

where R' is perfluoroalkyl of 1 to about 8 carbon atoms, a is at least 2 but less than 10, $+CH_2)_a$ is a straight or branched chain, and X is a halogen; and a condensed alkyl silicate.

28. The process of claim 27, wherein the fluorinated halosilane is trifluoropropyltrichlorosilane.

29. The process of claim 27, wherein the trialkylhalosilane is trimethylchlorosilane.

30. The process of claim 27, wherein the vinyldialkylhalosilane is vinyldimethylchlorosilane.

31. The improved solvent resistant vulcanizable silicone rubber composition of claim 1, wherein the resin of (ii) further comprises siloxane units selected from the group consisting of $R_3SiO_{0.5}$ units and $R_2R''SiO_{0.5}$ units, where the hydrocarbon substituent to Si ratio varies from about 0.8 to about 2.4, R is selected from the group consisting of alkyl radicals of 1 to about 8 carbon atoms and phenyl, R'' is a $+CH_2)_aR'$ radical where R' is a perfluoroalkyl of 1 to about 8 carbon atoms, a is at least 2 but less than 10, and $+CH_2)_a$ is a straight or branched chain.

32. The process of claim 13, wherein the resin of (ii) further comprises siloxane units selected from the group consisting of $R_3SiO_{0.5}$ units and $R_2R''SiO_{0.5}$ units, where the hydrocarbon substituent to Si ratio varies from about 0.8 to about 2.4, R is selected from the group consisting of alkyl radicals of 1 to about 8 carbon atoms and phenyl, R'' is a $+CH_2)_aR'$ radical where R' is a perfluoroalkyl of 1 to about 8 carbon atoms, a is at least 2 but less than 10, and $+CH_2)_a$ is a straight or branches chain.

* * * * *